United States Patent
Minassa et al.

(10) Patent No.: US 11,732,550 B2
(45) Date of Patent: Aug. 22, 2023

(54) LOW POWER CONSUMPTION ELECTRO-HYDRAULIC SYSTEM WITH PILOT CARTRIDGE

(71) Applicant: Halliburton Energy Services, Inc., Houston, TX (US)

(72) Inventors: Lorenzzo Breda Minassa, Tomball, TX (US); Robert William Gissler, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/645,259

(22) Filed: Dec. 20, 2021

(65) Prior Publication Data

US 2022/0235626 A1    Jul. 28, 2022

Related U.S. Application Data

(60) Provisional application No. 63/141,615, filed on Jan. 26, 2021, provisional application No. 63/141,618, (Continued)

(51) Int. Cl.
*E21B 34/14*    (2006.01)
*E21B 34/10*    (2006.01)
(Continued)

(52) U.S. Cl.
CPC .............. *E21B 34/14* (2013.01); *E21B 23/04* (2013.01); *E21B 33/0355* (2013.01);
(Continued)

(58) Field of Classification Search
CPC .......... E21B 34/14; E21B 34/10; E21B 34/16; E21B 23/04; E21B 33/0355; G05D 16/2022; G05D 16/204; F16K 31/40
See application file for complete search history.

(56) References Cited

U.S. PATENT DOCUMENTS 1,372,502 A * 3/1921 Grun ................... F04D 27/0261
                                                    91/367
4,579,177 A    4/1986 Going, III
(Continued)

FOREIGN PATENT DOCUMENTS

CA         1276874 C      11/1990
CN      106593301 A       4/2017
(Continued)

OTHER PUBLICATIONS

"Different Types of 3-Way Valves", Solenoid Solutions Inc., https://www.solenoidsolutionsinc.com/infographics/different-types-of-3-way-valves/, (n.d.), 5 pages.
(Continued)

*Primary Examiner* — Taras P Bemko
(74) *Attorney, Agent, or Firm* — Delizio, Peacock, Lewin & Guerra

(57) ABSTRACT

An electro-hydraulic control system actuates a control valve. A control module is controlled via two hydraulic lines and two electrical power lines. The control module uses one of the hydraulic lines as a "supply" line and the other line as a "return" line. The control module includes two normally closed (NC) solenoid valves (SOVs) that are coupled to the electrical power lines and can be controlled from the surface to open or close. The opening or closing of the NC SOVs in cooperation with hydraulic pressure on a "supply" line of the hydraulic lines operates the control valve. A NC hydraulic activated pilot cartridge in the control module can be actuated open, and movement of the control valve in either direction can continue for a short time without energizing either of the NC SOVs, therefore lowering a power demand required by the system.

19 Claims, 3 Drawing Sheets

Related U.S. Application Data filed on Jan. 26, 2021, provisional application No. 63/141,635, filed on Jan. 26, 2021, provisional application No. 63/141,630, filed on Jan. 26, 2021, provisional application No. 63/141,624, filed on Jan. 26, 2021.

(51) Int. Cl.

| | | |
|---|---|---|
| *E21B 23/04* | (2006.01) | |
| *E21B 33/035* | (2006.01) | |
| *G05D 16/20* | (2006.01) | |
| *E21B 34/06* | (2006.01) | |
| *F16K 31/40* | (2006.01) | |
| *E21B 34/16* | (2006.01) | |

(52) U.S. Cl.
CPC ............ *E21B 34/066* (2013.01); *E21B 34/10* (2013.01); *F16K 31/40* (2013.01); *G05D 16/204* (2013.01); *G05D 16/2022* (2019.01); *E21B 34/16* (2013.01)

(56) References Cited

U.S. PATENT DOCUMENTS

| | | | |
|---|---|---|---|
| 4,736,791 A | 4/1988 | Rorden | |
| 4,942,926 A | 7/1990 | Lessi | |
| 4,945,995 A | 8/1990 | Tholance et al. | |
| 5,065,825 A | 11/1991 | Bardin et al. | |
| 6,053,202 A | 4/2000 | Cunningham | |
| 6,179,052 B1 | 1/2001 | Purkis et al. | |
| 6,470,970 B1 | 10/2002 | Purkis et al. | |
| 6,715,558 B2 | 4/2004 | Williamson | |
| 10,745,998 B2 | 8/2020 | Prost et al. | |
| 2001/0037884 A1 | 11/2001 | Schultz et al. | |
| 2002/0007946 A1 | 1/2002 | Purkis et al. | |
| 2006/0168955 A1 | 8/2006 | Longfield et al. | |
| 2006/0201321 A1* | 9/2006 | Loedige | F15B 11/05 137/596.2 |
| 2006/0254763 A1 | 11/2006 | Tips et al. | |
| 2007/0163774 A1 | 7/2007 | Hosatte et al. | |
| 2010/0059233 A1* | 3/2010 | Smithson | E21B 47/125 166/385 |
| 2010/0084588 A1 | 4/2010 | Curtiss, III et al. | |
| 2010/0236790 A1* | 9/2010 | Smithson | E21B 47/125 166/373 |
| 2012/0067593 A1 | 3/2012 | Powell et al. | |
| 2012/0073670 A1 | 3/2012 | Lymberopoulos | |
| 2017/0022790 A1 | 1/2017 | Leitch | |
| 2018/0119522 A1 | 5/2018 | Prost et al. | |
| 2019/0055812 A1 | 2/2019 | Halily et al. | |
| 2019/0316433 A1 | 10/2019 | Schroit et al. | |
| 2020/0190943 A1 | 6/2020 | Clayton et al. | |
| 2020/0217157 A1 | 7/2020 | Oser et al. | |
| 2020/0248533 A1 | 8/2020 | Clayton et al. | |
| 2021/0102440 A1* | 4/2021 | Minassa | F16K 31/1226 |
| 2021/0254431 A1* | 8/2021 | Prost | E21B 43/12 |
| 2022/0017051 A1* | 1/2022 | Kim | B60T 13/662 |

FOREIGN PATENT DOCUMENTS

| | | |
|---|---|---|
| EP | 2324192 B1 | 5/2018 |
| WO | 9747852 | 12/1997 |
| WO | 2006124024 | 11/2006 |
| WO | 2010042298 | 4/2010 |
| WO | 2019226160 | 11/2019 |
| WO | 2019246501 A1 | 12/2019 |

OTHER PUBLICATIONS

"How A 2-Way Normally Closed Solenoid Valve Works", Solenoid Solutions Inc., https://www.solenoidsolutionsinc.com/infographics/how-a-2-way-normally-closed-solenoid-valve-works/, (n.d.), 5 pages.
"HS Interval Control Valves", Halliburton, 2017, 2 pages.
"Intelligent Completions: SmartWell Completion Systems", Halliburton, 2013, 8 pages.
"Lee FLOSERT® Miniature Flow Regulating Valves", https://news.thomasnet.com/companystory/lee-flosert-miniature-flow-regulating-valves-40006265, (n.d.), 6 pages.
"More on Lee Flow Controls", The Lee Company, https://www.theleeco.com/products/precision-microhydraulics/flow-control-valves/more-on-lee-flow-controls/, (n.d.), 3 pages.
"Product Details: Piloting Solenoid Valve SDBB2131002A", The Lee Company, http://leecat.theleeco.com/ecatalog/piloting-solenoid-valves/en/SDBB2131002A, 2011, 2 pages.
"SmartPlex® Downhole Control System", Halliburton, 2015, 2 pages.
"Solenoid Valves", The Lee Company, https://www.theleeco.com/products/precision-microhydraulics/solenoid-valves/, (n.d.), 4 pages.
"Technical Hydraulic Handbook (12th ed.)", The Lee Company, 2018, 819 pages.
"PCT Application No. PCT/US2021/064576, International Search Report and Written Opinion", dated May 31, 2022, 9 pages.
"PCT Application No. PCT/US2021/073048, International Search Report and Written Opinion", dated Apr. 19, 2022, 11 pages.
"PCT Application No. PCT/US2021/073049, International Search Report and Written Opinion", dated Apr. 19, 2022, 10 pages.
"PCT Application No. PCT/US2021/073051, International Search Report and Written Opinion", dated Apr. 18, 2022, 10 pages.
"PCT Application No. PCT/US2021/073054, International Search Report and Written Opinion", dated Apr. 15, 2022, 10 pages.

\* cited by examiner

LOW POWER CONSUMPTION ELECTRO-HYDRAULIC SYSTEM WITH PILOT CARTRIDGE

TECHNICAL FIELD

The disclosure generally relates to the field of obtaining hydrocarbons (e.g., as oil or gas) from wells and, more specifically, to methods and equipment for completion of wellbores and control and improvement of production.

BACKGROUND

Various tools and tool systems have been developed to control, select, and/or regulate the production of hydrocarbon fluids and other fluids produced downhole from subterranean wells. Downhole well tools such as sliding sleeves, sliding windows, interval control valves, safety valves, lubricator valves, and gas lift valves are examples of control tools positioned downhole in wells.

Sliding sleeves and similar devices placed in isolated sections of the wellbore to control fluid flow from such wellbore sections. Multiple sliding sleeves and at least one interval control valves (ICV) can be placed in different isolated sections within tubing to jointly control fluid flow within the particular tubing section, and to commingle the various fluids within a common tubing interior.

BRIEF DESCRIPTION OF THE DRAWINGS

Embodiments of the disclosure may be better understood by referencing the accompanying drawings.

DESCRIPTION OF EMBODIMENTS

The description that follows includes example systems and methods that embody examples of the disclosure. However, it is understood that this disclosure may be practiced without these specific details. For instance, this disclosure refers to electro-hydraulic circuits for controlling an interval control valve (ICV) in a completion system in illustrative examples. The embodiments of this disclosure can be also applied to controlling other downhole valves or instruments and can be implemented in any system combining hydraulic power and electric power. In other instances, well-known instruction instances, protocols, structures, and techniques have not been shown in detail in order not to obfuscate the description.

Systems for controlling multiple downhole tools, particularly ICVs, can include electric and hydraulic lines (electro-hydraulic systems). These systems use substantial power to control the downhole tools. A dual solenoid electro-hydraulic control system is disclosed herein that controls downhole tools with low power consumption. The system's power consumption can be low enough to be compatible with disconnect tools using inductive coupling.

In the disclosed electro-hydraulic control system, a control module is hydraulically coupled to an ICV control the ICV. The control module is coupled to the surface via two hydraulic lines and two electrical power lines proceeding thereto. The control module uses one of the hydraulic lines as a "supply" line and the other line as a "return" line. Either of the two hydraulic lines can be used to open or close the ICV. The control module includes two normally closed (NC) solenoid valves (SOVs) each coupled to one of two electrical power lines that can be controlled from the surface to open or close. The opening and closing of the two NC SOVs can cooperate with pressure being applied to at least one hydraulic line to operate (i.e., close or open) the ICV. The use of a normally closed (NC) hydraulic activated pilot cartridge in conjunction with the two hydraulic lines allows a first NC SOV to function as a toggle on and a second NC SOV as a toggle off to control opening or closing of the ICV with minimal electric power needed, i.e., not requiring the NC SOVs to remain powered through an entire movement cycle of the ICV.

The phrasing "hydraulically coupled with" refers to the coupling of components with a fluid conduit that is charged or under pressure and allows for the variations that may occur in various implementations. For instance, "component A is hydraulically coupled with component B" encompasses these non-limiting cases: A directly connected to B by a hydraulic conduit or A connected to B with one or more intervening components and multiple conduits there between.

Example Illustrations

Figure 1:
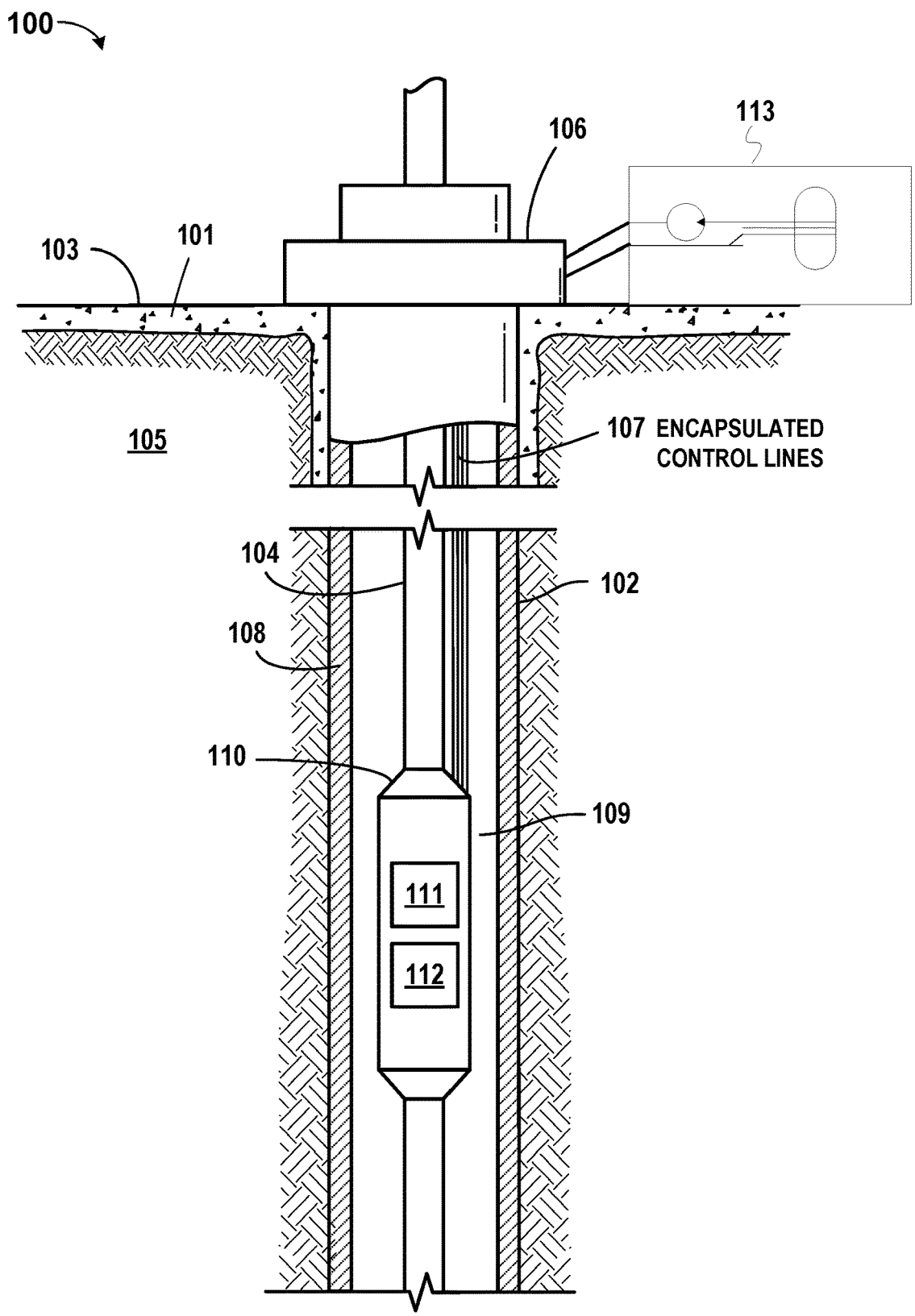
FIG. 1 depicts a partial cross-sectional view of a well completion 100 that includes a low power electro-hydraulic circuit with two three-way NC SOVs that controls an ICV 112.

FIG. 1 depicts a partial cross-sectional view of a well completion 100 that includes a low power electro-hydraulic circuit with two three-way NC SOVs that controls an ICV 112. The electro-hydraulic circuit is formed with a hydraulic power system 113, encapsulated control lines 107, and a control module/hydraulic manifold assembly 111. An ICV 112 controlled via the control module 111 can be considered part of the circuit or external to the circuit. The well completion 100 includes a wellbore 102 extending through, i.e., formed in, a subterranean formation 105 from a wellhead 106 located at a surface 103. The wellbore 102 includes a casing string 108. The casing string 108 can be at least partially cemented into the subterranean formation, e.g., via one or one or more layers of cement 101. Although cement 101 is shown near the surface 103, in one or more embodiments the cement 101 can extend the length of the wellbore 102. Although the wellbore 102 is depicted as a single vertical wellbore, the wellbore 102 can include deviated or horizontal portions. Although only one casing string 108 is shown, multiple casing strings may be radially and/or circumferentially disposed around casing string 108.

A tubing string 104 is positioned in the wellbore 102 inside the casing string 108, forming an annulus 109 between the tubing string 104 and the casing string 108. A completion component or sub-assembly ("-sub") 110 is included in (or physically coupled to) the tubing string 104. Both the completion sub 110 and the tubing string 104 collectively (possibly with other completion subs and joined tubing) form the tubing string of the well completion 100.

Encapsulated control lines 107 extend from the surface 103 of the wellbore 102 to the completion sub 110. The control lines 107 include two electrical power lines and at least two hydraulic lines. The control lines 107 can communicatively couple the completion sub 110 to a computing device that actuates a downhole tool, e.g., one or more valves. Hydraulic lines of the control lines 107 are coupled to the hydraulic power system 113 and the control module 111. The hydraulic power system 113 converts mechanical energy into hydraulic energy that is provided to the control module 111 via the hydraulic lines of the control lines 107.

The completion sub 110 includes the control module 111 and the ICV 112. The control module 111 is hydraulically coupled to the ICV 112 and includes portions of the control lines 107. Although shown as components of the completion sub 110, the control module 111 and/or the ICV 112 can be coupled directly to the tubing string 104 and/or to one another, e.g., via threaded ends.

The ICV 112 controls flow between an interior and exterior of the tubing string 104. For example, the exterior of the ICV 112 can be exposed to the annulus 109 and the ICV 112 can regulate flow between the interior of the tubing string 104 and the annulus 109.

Figure 2:
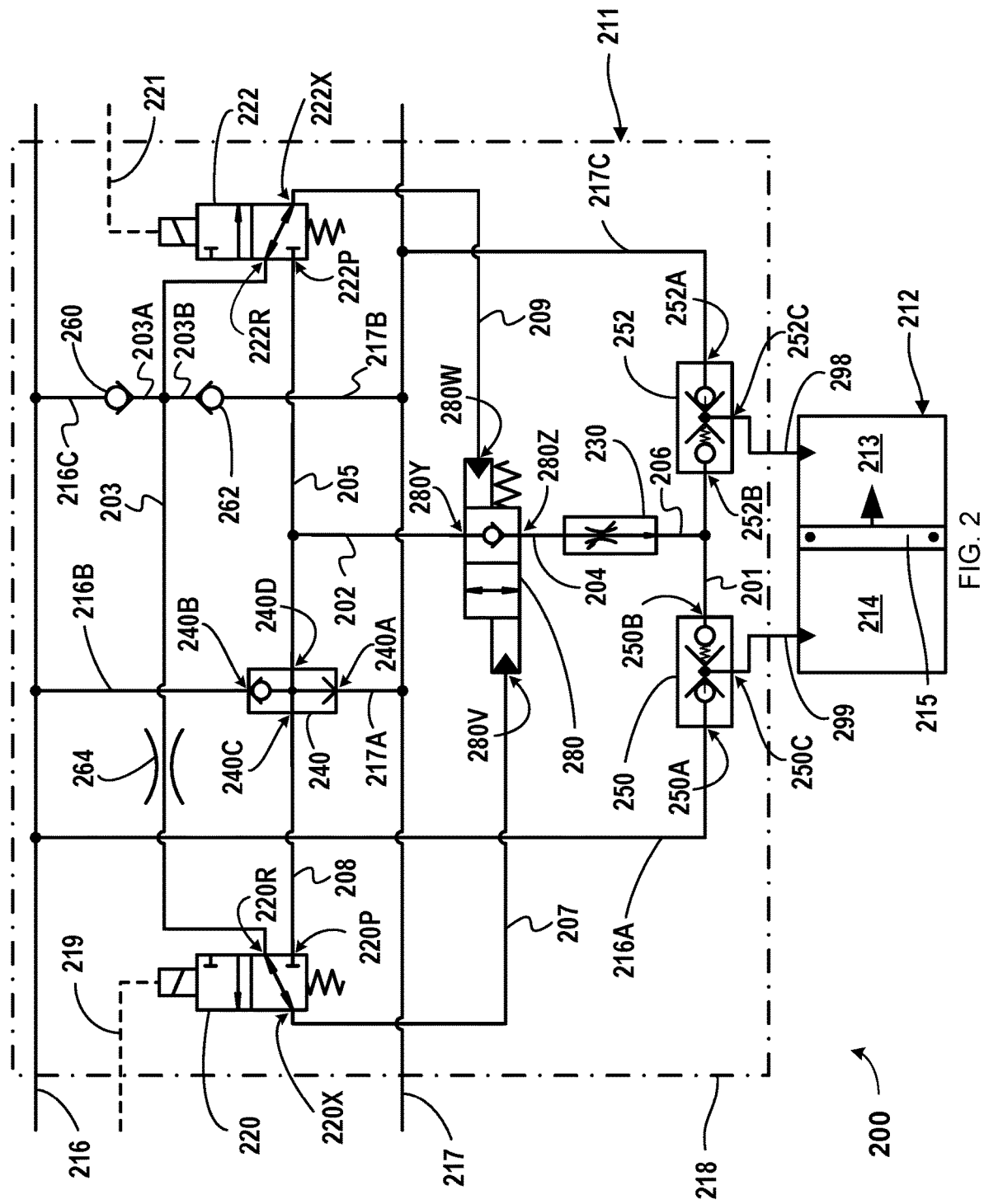
FIG. 2 depicts components of a control module of an electro-hydraulic circuit with two three-way normally closed solenoid valves and a normally closed hydraulic activated pilot cartridge for actuating an ICV.

FIG. 2 depicts components of a control module of an electro-hydraulic circuit with two three-way normally closed solenoid valves and a normally closed hydraulic activated pilot cartridge for actuating an ICV. A control module 211 includes a housing 218. The housing 218 can be coupled to tubing, and the housing 218 protects the components of the control module 211. The components of the control module 211 include a normally closed (NC) solenoid valve (SOV) 220, an NC SOV 222, a shuttle valve 240, a check valve 260, a check valve 262, a flow regulator/restrictor 264, a dynamic flow regulator/restrictor 230, an inverse shuttle valve 250, an inverse shuttle valve 252, and an NC hydraulic activated pilot cartridge 280. The components of the control module 211 are disposed within the housing 218.

The ICV 212 is divided into two sides, an open side 214 and a close side 213, by a double-actuated floating piston 215. The movement of the double-actuated floating piston 215 controls flow of fluid between the interior of a tubing string and an annulus. For example, movement of the double-actuated floating piston 215 towards the close side 213, i.e., opening the ICV, can increase flow between the interior of the tubing string and the annulus, and movement of the double-actuated floating piston 215 towards the open side 214, i.e., closing the ICV, reduces flow between the interior of the tubing string and the annulus. The double-actuated floating piston 215 of the ICV 212 can be fully closed, i.e., fully blocking flow between the interior of the tubing string and the annulus, or fully open to allow maximum flow between the interior of the tubing string and the annulus.

A hydraulic line 216, and a hydraulic line 217 route through the control module 211. A "hydraulic line" as used herein refers to a hydraulic fluid conduit implemented as appropriate for the environment (e.g., a steel line or a hydraulic hose). FIG. 2 depicts the hydraulic lines 216, 217 entering and exiting the housing 218 via separate apertures. Embodiments may route the hydraulic lines 216, 217 via separate apertures. Each of the hydraulic lines 216, 217 branches within the housing 218. The hydraulic lines 216, 217 each branch to connect to different ports of inverse shuttle valves 250 and 252, respectively. Each of the hydraulic lines 216, 217 also branch to connect to different ports of a shuttle valve 240. The hydraulic lines 216, 217 also branch to connect to check valves 260 and 262, respectively. For the branching of the hydraulic lines, embodiments can use a tee or a flow divider. The dynamic flow regulator provides flow control to ensure that the hydraulic circuit conforms to an operating range of pressures even with branching/splitting with tees. An electrical power line 219 routes into the control module 211 through an aperture of the housing 218 to connect to the NC SOV 220. An electrical power line 221 routes into the control module 211 through an aperture of the housing 218 to connect to the NC SOV 222. A hydraulic line 298 connects the inverse shuttle valve 252 to the close side 213 of the ICV 212. A hydraulic line 299 connects the inverse shuttle valve 250 to the open side 214 of the ICV 212.

As depicted, both of the NC SOVs 220 and 222 are two-position, three-way NC SOVs. NC SOV 220 has a pressure port or P-port 220P, a return port or R-port 220R, and a control port or X-port 220X. NC SOV 222 has a pressure port or P-port 222P, a return port or R-port 222R, and a control port or X-port 222X. The control port of each SOV can also be referred to as a "C-port" instead of an X-port.

Each NC SOV has two states, an energized state and a deenergized state, corresponding to the two positions of the valve. In the deenergized state, each NC SOV 220, 222 is in a first, closed valve position that blocks hydraulic communication between the X-port 220X and the P-port 220P of the NC SOV 220 and blocks hydraulic communication between the X-port 222X and the P-port 222P of the NC SOV 222. In the closed position of the NC SOV 220, hydraulic communication is allowed between the X-port 220X and the R-port 220R. In the closed position of NC SOV 222, hydraulic communication is allowed between the R-port 222R and the X-port 222X. In the energized state, each NC SOV is in a second, open valve position. In the open position, hydraulic communication is allowed between the X-port 220X and P-port 220P of the NC SOV 220 and similarly between the X-port 222X and P-port 222P of the NC SOV 222. Hydraulic communication is blocked in the open position between R-port 220R and X-port 220X of the NC SOV 220 and similarly between R-port 222R and X-port 222X of the NC SOV 222. The NC SOV 220 can be energized via the electrical power line 219. A controller and an electrical power source that controls the NC SOVs 220, 222 can be disposed on the surface or at a location remote from the well. Similarly, the NC SOV 222 can be energized via the electrical power line 221 from the same or a different controller and the electrical power source to energize or deenergize the NC SOV 222.

Hydraulic line branches throughout the electro-hydraulic circuit connect hydraulic line 216 and hydraulic line 217 to components within the system. A hydraulic line branch 216A connects the hydraulic line 216 to an A-port 250A of the inverse shuttle valve 250. A hydraulic line branch 217C connects the hydraulic line 217 to an A-port 252A of the inverse shuttle valve 252. A hydraulic line branch 216B connects the hydraulic line 216 to a B-port 240B of the shuttle valve 240. A hydraulic line branch 216C connects the hydraulic line 216 to the check valve 260, wherein the check valve 260 blocks pressure supply and/or fluid supplied from the hydraulic line 216 from entering the broader electro-hydraulic circuit through the hydraulic line branch 216C. A hydraulic line branch 217A connects the hydraulic line 217 to an A-port 240A of the shuttle valve 240. A hydraulic line branch 217B connects the hydraulic line 217 to the check valve 262 which blocks pressure and/or fluid within the hydraulic line branch 217B from entering the NC SOVs through the R-port 220R or the R-port 222R.

The dynamic flow regulator 230 has an automatically adjustable variable-metering orifice which is configured to provide a constant volumetric flow rate therethrough. The dynamic flow regulator 230 senses the volumetric flow rate in terms of a differential pressure across a fixed orifice, and the variable metering orifice automatically adjusts to keep the volumetric flow rate constant therethrough over a range of pressure differentials across the dynamic flow regulator 230. The dynamic flow regulator 230 protects the NC SOVs 220, 222, the NC hydraulic activated pilot cartridge 280 and can also be used to provide bidirectional choke capability to the ICV 212. A hydraulic line 204 connects the dynamic flow regulator 230 to a Z-port 280Z of the NC hydraulic activated pilot cartridge 280. A hydraulic line branch 206 connects the dynamic flow regulator 230 to a hydraulic line 201, wherein the dynamic flow regulator 230 is hydraulically coupled to a B-port 250B of the inverse shuttle valve 250 and to a B-port 252B of the inverse shuttle valve 252.

The shuttle valve 240 is a four-way shuttle valve comprising four ports: the A-port 240A, the B-port 240B, a C-port 240C, and a D-port 240D. The shuttle valve 240 includes internal components that allow hydraulic communication between the A-port 240A and both the C-port 240C and D-port 240D when the pressure on the A-port 240A is higher than the pressure on the B-port 240B. Hydraulic communication is allowed between the B-port 240B and both the C-port 240C and D-port 240D when the pressure on the B-port 240B is higher than the pressure on the A-port 240A. Hydraulic communication between the ports of the shuttle valve 240 can be unidirectional or bidirectional. Note, while a four-port shuttle valve is depicted in FIG. 2, the shuttle valve 240 could instead have only three ports, i.e., only having an A-port, B-port, and C-port, with the flow from the C-port splitting to supply the NC SOVs 220, 222 and/or the NC hydraulic activated pilot cartridge 280. A hydraulic line 208 connects the P-port 220P of the NC SOV 220 to the C-port 240C of the shuttle valve 240. A hydraulic line 205 connects the D-port 240D of the shuttle valve 240 to the R-port 222R of the NC 222 and to a hydraulic line branch 202 which connects to a Y-port 280Y of the NC hydraulic activated pilot cartridge 280.

Each of the inverse shuttle valves 250, 252 has three ports. The inverse shuttle valve 250 has the A-port 250A, the B-port 250B, and a C-port 250C. The inverse shuttle valve 252 has the A-port 252A, the B-port 252B, and a C-port 252C. Each inverse shuttle valve includes internal components that allow hydraulic communication either between the respective A-port and C-port when the pressure on the A-port is less than the pressure on the B-port, or between the respective B-port and C-port, when the pressure on the B-port is less than or equal to the pressure on the A-port. Hydraulic communication between the ports of each inverse shuttle valve can be unidirectional or bidirectional. A bias mechanism, e.g., a spring, can be included in each of the inverse shuttle valves 250, 252 to ensure hydraulic communication through the inverse shuttle valve via the respective B-port and C-port when the pressure in the respective A-port equals the pressure on the B-port.

The NC hydraulic activated pilot cartridge 280 comprises four ports in total. The NC hydraulic activated pilot cartridge 280 has two flow ports, the Y-port 280Y and the Z-port 280Z, and two pilot ports, a V-port 280V and a W-port 280W. The NC hydraulic activated pilot cartridge 280 is a valve biased to a closed position by a biasing member, e.g., a spring. In the closed position, the NC hydraulic activated pilot cartridge 280 allows flow in a first direction from the Z-port 280Z to the Y-port 280Y but blocks flow in a second direction from the Y-port 280Y to the Z-port 280Z. In the open position, the NC hydraulic activated pilot cartridge 280 allows bidirectional hydraulic communication between the Z-port 280Z and the Y-port 280Y. The NC hydraulic activated pilot cartridge 280 is actuated to close and open positions by the two pilot ports 280V and 280W. A hydraulic line 207 connects the X-port 220X of the NC SOV 220 to the V-port 280V of the NC hydraulic activated pilot cartridge 280. Applying pressure on the V-port 280V sufficient to overcome the biasing close force will move the NC hydraulic activated pilot cartridge 280 to its open position, thereby allowing bidirectional hydraulic communication between the Z-port 280Z and the Y-port 280Y. A hydraulic line 209 connects the X-port 222X of the NC SOV 222 to the W-port 280W of the NC hydraulic activated pilot cartridge 280. Applying sufficient pressure on the W-port 280W (i.e., enough pressure to a force that, added to the biasing close force from the biasing member, is greater than force from the pressure applied to the V-port 280V) and/or removing pressure on the V-port 280V, will move the NC hydraulic activated pilot cartridge 280 back to a closed position.

Hydraulic line 216 is hydraulically coupled to the check valve 260 via the hydraulic line branch 216C. A hydraulic line branch 203A connects the check valve 260 to a hydraulic line 203 which further connects to the R-port 220R of the NC SOV 220, to the R-port 222R of the NC SOV 222, to the check valve 262 via a hydraulic line branch 203B, and to a flow regulator 264 which is disposed on the hydraulic line 203. The flow regulator 264 ensures that no pressure spikes will induce instability within the NC hydraulic activated pilot cartridge 280. Check valve 260 is oriented to allow hydraulic communication between the R-port 220R and R-port 222R and to block hydraulic communication between hydraulic line branch 216C and hydraulic line branch 203A.

Hydraulic line 217 is hydraulically coupled to the check valve 262. The check valve 262 is also hydraulically coupled to the check valve 260, to the R-port 220R of NC SOV 220 and the R-port 222R of NC SOV 222 via hydraulic line 203, and to the flow regulator 264. The check valve 262 is oriented to allow hydraulic communication between R-port 220R and R-port 222R along hydraulic line 203 and to block hydraulic communication between hydraulic line branch 217B and hydraulic line branch 203B.

The Z-port 280Z of the NC hydraulic activated pilot cartridge 280 is hydraulically coupled to both the B-ports 250B and 252B of inverse shuttle valves 250, 252 via the dynamic flow regulator 230. The Z-port 280Z is hydraulically coupled to a first port of the dynamic flow regulator 230 by a hydraulic line 204, and a second port of the dynamic flow regulator 230 is hydraulically coupled to B-ports 250B and 252B of the inverse shuttle valves 250, 252, by the hydraulic line branch 206 and hydraulic line 201. The C-port 250C of the inverse shuttle valve 250 is coupled to the open side 214 of the ICV 212 via hydraulic line 299, and the C-port 252C of the inverse shuttle valve 252 is coupled to the close side 213 of the ICV 212 via hydraulic line 298.

Example operation of the electro-hydraulic circuit is now described. Either hydraulic line 216 or hydraulic line 217 can function as a supply line for actuating an ICV in an open or close direction, and the remaining hydraulic line can function as the return line.

Building pressure on hydraulic line 216 as the supply line while both the NC SOV 220 and the NC SOV 222 are deenergized results in no movement of the ICV 212, as hydraulic communication between hydraulic line 216 and the ICV 212 is blocked by the deenergized NC SOVs 220, 222, and the NC hydraulic activated pilot cartridge 280 in its closed state, wherein flow is permitted in a single direction from the Z-port 280Z to the Y-port 280Y. If both NC SOVs 220, 222 are energized with hydraulic line 216 as the supply line, this too results in no movement of the ICV. The NC hydraulic activated pilot cartridge 280 is biased closed by the biasing member; if an equal ingress pressure from hydraulic line 216 enters both the hydraulic line 207 and the hydraulic line 209 via the energized NC SOVs 220, 222, the equivalent pressure on both the V-port 280V and the W-port 280W of the NC hydraulic activated pilot cartridge 280 will cause the pilot cartridge to remain in the closed state, preventing ingress pressure from reaching the ICV 212. A similar scenario would occur if the hydraulic line 217 is used as the supply line. If hydraulic line 217 is pressurized and both NC SOVs 220, 222 are deenergized, hydraulic communication between the supply line and the ICV 212 would be blocked by both deenergized NC SOVs 220, 222, by the check valve 262, and by the inverse shuttle valve 252. If both NC SOVs 220, 222 are energized with hydraulic line 217 as the supply line, then an equal ingress pressure on both pilot ports of the NC hydraulic activated pilot cartridge 280, V-port 280V and W-port 280W, would result in the pilot cartridge 280 remaining closed. Thus, a single NC SOV must be energized at a time to initiate actuation of the ICV 212 in either the open or the close direction.

To actuate the ICV 212 in an open direction, hydraulic line 216 is pressurized as the supply line to a pressure exceeding that of the hydraulic line 217, and the NC SOV 220 is energized via the electrical power line 219. The higher pressure on the B-port 240B forces a ball within the shuttle valve 240 into a seat over the A-port 240A, effectively closing the port whilst hydraulic communication is allowed between the B-port 240B and both the C-port 240C and D-port 240D. The supply pressure forces fluid from the hydraulic line 216 through the C-port 240C and the D-port 240D to the P-ports 220P, 222P of the NC SOVs 220, 222.

With the NC SOV 220 energized, the NC SOV 220 moves from its close position to its open position to allow hydraulic communication between the P-port 220P and the X-port 220X while subsequently blocking hydraulic communication between the X-port 220X and the R-port 220R. Ingress pressure moves through the NC SOV 220 from the P-port 220P to the X-port 220X and on to the open pilot port—V-port 280V—of the NC hydraulic activated pilot cartridge 280 via hydraulic line 207. The remaining supply pressure within hydraulic line 207, after moving through the NC SOV 220, is then applied on the V-port 280V where it can move the NC hydraulic activated pilot cartridge 280 to an open position, i.e., the supply pressure is sufficient to overcome the biasing close force of the NC hydraulic activated pilot cartridge 280, thereby allowing bidirectional hydraulic communication across the Z-port 280Z and Y-port 280Y. Since the NC SOV 222 is deenergized, ingress pressure supplied by hydraulic line 216 is blocked from actuating the close pilot port—W-port 280W—via hydraulic line 209. The NC hydraulic activated pilot cartridge 280 can remain in the open position even when the NC SOV 220 is deenergized, such as when there is sufficient pressure on the Y-port 280Y to act against the biasing close force of the NC hydraulic activated pilot cartridge 280. Being able to only energize the NC SOV 220 for a short time and still keep the NC hydraulic activated pilot cartridge 280 open allows less electrical power to be consumed by the electro-hydraulic circuit.

With the NC hydraulic activated pilot cartridge 280 open, pressure is applied to the B-port 250B of inverse shuttle valve 250 and to the B-port 252B of the inverse shuttle valve 252 via the dynamic flow regulator 230. The variable metering orifice of the dynamic flow regulator 230 automatically adjusts to maintain a constant differential pressure across the dynamic flow regulator 230. Because hydraulic line 216 is pressurized, the A-port 250A of the inverse shuttle valve 250 experiences a pressure near that of the supply pressure because of its direct connection to hydraulic line 216 via hydraulic line branch 216A, whereas the pressure traveling through the electro-hydraulic circuit to the B-ports 250B and 252B equalizes as it navigates the system. Since hydraulic line 217 is the return line and not pressurized to the extent of hydraulic line 216, the A-port 252A of the inverse shuttle valve 252 will experience a lower pressure than the pressure exerted on the B-port 252B. Thus, this configuration will force the inverse shuttle valve 250 to allow hydraulic communication between the B-port 250B and the C-port 250C and on to the open side 214 of the ICV 212 via hydraulic line 299. A biasing member (e.g., a biasing spring or the like) can be included to force an internal piston on the A-port 250A side of the inverse shuttle valve 250 to seal thereby assuring flow to the open side 214 of the ICV 212. The inverse shuttle valve 252 will allow hydraulic communication between the lower-pressured A-port 252A and the C-port 252C, thereby creating a pathway for return flow out of the close side 213 of the ICV. The pressure influx into the open side 214 of the ICV 212 forces the double-actuated floating piston 215 into the close direction, thereby opening the ICV 212.

With the NC hydraulic activated pilot cartridge 280 in its open position, the ICV 212 will continue to move in the close direction until the NC hydraulic activated pilot cartridge 280 is actuated back to its close position. The NC hydraulic activated pilot cartridge 280 can be actuated to its close position by energizing NC SOV 222 via electrical power line 221 and/or by lowering pressure on hydraulic line 216. Once energized, the NC SOV 222 moves to its open position thereby allowing hydraulic communication between the D-port 240D of the shuttle valve 240, the P-port 222P, the X-port 222X of NC SOV 222, and the close pilot port—the W-port 280W—of the NC hydraulic activated pilot cartridge 280. Applying pressure on the W-port 280W and reducing pressure on the V-port 280V (due to the NC SOV 220 being deenergized) causes the NC hydraulic activated pilot cartridge 280 to move back to its closed position, thereby halting pressure supply to the inverse shuttle valve 250 and from the inverse shuttle valve 252, thereby halting movement of the ICV 212.

To actuate the ICV 212 in a close direction, hydraulic line 217 is pressurized as the supply line via the hydraulic power system 113 to a pressure exceeding that of the hydraulic line 216, and the NC SOV 220 is energized via the electrical power line 219. Supply pressure travels to the A-port 240A of shuttle valve 240 via hydraulic line branch 217A, and the higher pressure on A-port 240A forces a ball within the shuttle valve 240 into a seat over the B-port 240B, effectively closing the port whilst hydraulic communication is allowed between the A-port 240A and both the C-port 240C and D-port 240D.

With the NC SOV 220 energized, the NC SOV 220 moves from its close position to its open position to allow hydraulic communication between the P-port 220P, X-port 220X, and the open pilot port—V-port 280V—of the NC hydraulic activated pilot cartridge 280. The pressure thus applied on the V-port 280V can move the NC hydraulic activated pilot cartridge 280 to an open position, i.e., having sufficient pressure to overcome the biasing close force of the NC hydraulic activated pilot cartridge 280. The NC hydraulic activated pilot cartridge 280 can remain in the open position even when the NC SOV 220 is deenergized, such as when there is sufficient pressure on the Y-port 280Y to act against the biasing close force of the NC hydraulic activated pilot cartridge 280. Energizing the NC SOV 220 for a short time and keeping the NC hydraulic activated pilot cartridge 280 open allows less power to be consumed by the electro-hydraulic circuit.

With the NC hydraulic activated pilot cartridge 280 open, bidirectional hydraulic communication between the Z-port 280Z and Y-port 280Y allows supply pressure from hydraulic line 217 exiting the D-port 240D of shuttle valve 240 to enter the NC hydraulic activated pilot cartridge 280 via the Y-port 280Y and exit via the Z-port 280Z. The supply pressure is then applied to the B-port 250B of the inverse shuttle valve 250 and to the B-port 252B of inverse shuttle valve 252 via the dynamic flow regulator 230. The variable metering orifice of the dynamic flow regulator 230 automatically adjusts to maintain a constant differential pressure across the dynamic flow regulator 230. The A-port 252A of inverse shuttle valve 252 has a direction connection to the supply line, hydraulic line 217, via the hydraulic line branch 217C. As the pressure on B-port 252B is less than the pressure applied to A-port 252A of inverse shuttle valve 252, the inverse shuttle valve 252 will allow hydraulic communication between B-port 252B and C-port 252C as supply pressure forces fluid into the close side 213 of the ICV 212 via hydraulic line 298. A biasing member (e.g., a biasing spring or the like) can be included to force an internal piston on the A-port 252A side of the inverse shuttle valve 252 to seal thereby assuring flow to the close side 213 of the ICV 212. Meanwhile, the pressure applied to the B-port 250B closes B-port 250B of inverse shuttle valve 250 because hydraulic line 216, as the return line, comprises a lower pressure than that exerted on the B-port 250B. This opens a hydraulic communication pathway between the C-port 250C and A-port 250A of inverse shuttle valve 250. Supply pressure exits the inverse shuttle valve 252 from the C-port 252C and enters the close side 213 of the ICV 212 via hydraulic line 298. The pressure then actuates the ICV 212 closed; as the double-actuated floating piston moves toward the open side 214, pressure and thereby fluid from the open side 214 are relieved through the inverse shuttle valve 250 from the C-port 250C to the A-port 250A and out to hydraulic line 216.

With the NC hydraulic activated pilot cartridge 280 in its open position, the ICV 212 will continue to move in the open direction until the NC hydraulic activated pilot cartridge 280 is actuated back to its close position. The NC hydraulic activated pilot cartridge 280 can be actuated to its close position by energizing NC SOV 222 via electrical power line 221 and/or by lowering pressure on hydraulic line 216. Once energized, NC SOV 222 moves to its open position thereby allowing hydraulic communication between the D-port 240D of the shuttle valve 240, the P-port 222P and X-port 222X of the NC SOV 222, and the close pilot port—the W-port 280W—of the NC hydraulic activated pilot cartridge 280. Having pressure on the W-port 280W and lack of pressure on the V-port 280V (due to the NC SOV 220 being deenergized) causes the NC hydraulic activated pilot cartridge 280 to move back to its closed position, thereby halting pressure supply to the inverse shuttle valve 252 and from the inverse shuttle valve 250, thereby halting movement of the ICV 212.

Either hydraulic line 216 or hydraulic line 217 can function as the supply line or the return line. To open the ICV, hydraulic line 216 is depicted as the supply line in conjunction with energizing the NC SOV 220. However, the ICV can also be actuated to open by utilizing hydraulic line 217 and energizing the NC SOV 220. The hydraulic lines can be interchangeable in regard to which is the supply or return line for opening and closing the ICV 212, but the NC SOVs are specific in their function. NC SOV 220 is energized to "toggle on" the NC hydraulic activated pilot cartridge 280, and NC SOV 222 is energized to "toggle off" the NC hydraulic activated pilot cartridge 280 when halting the ICV movement is desired.

Figure 3:
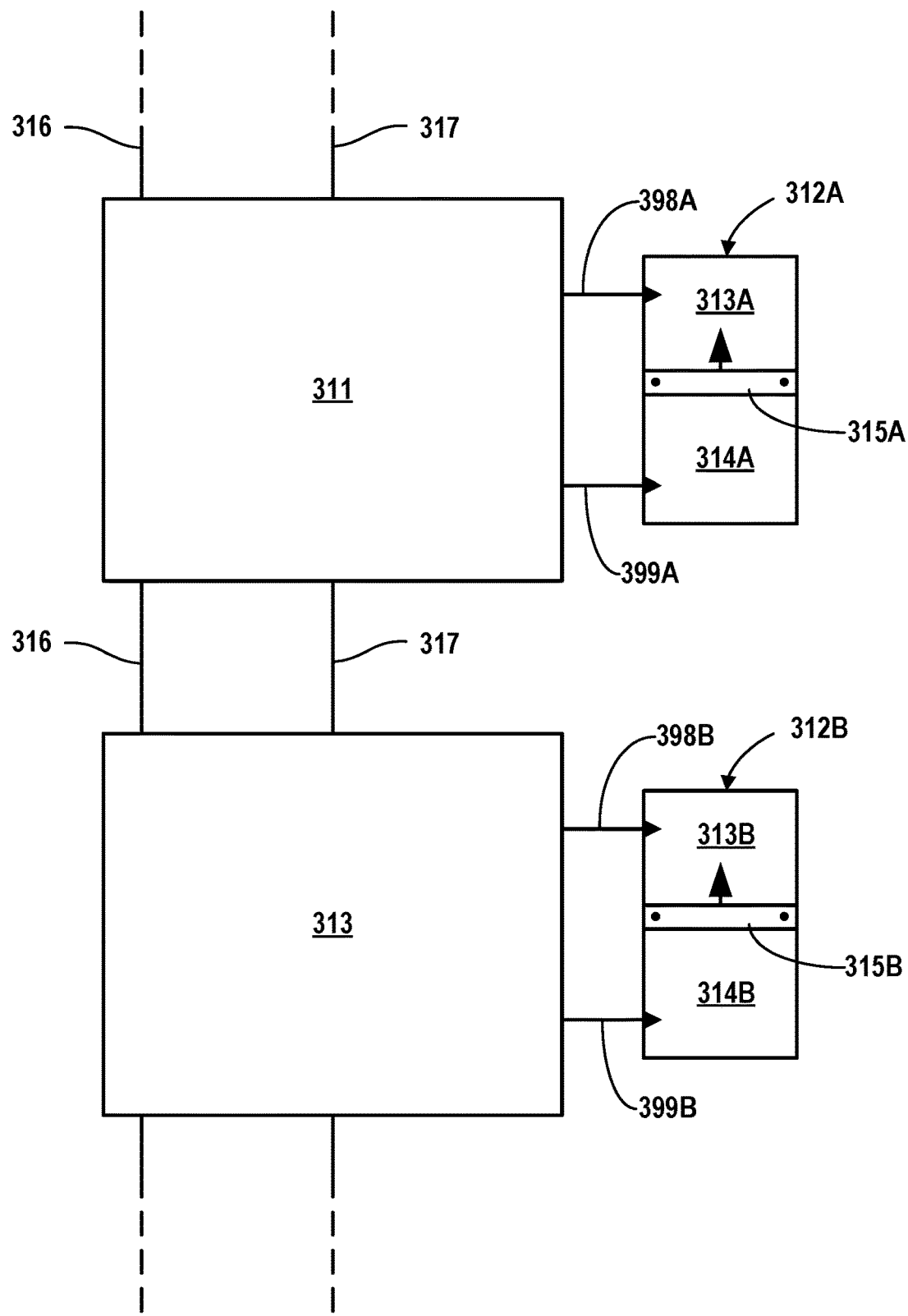
FIG. 3 depicts a plurality of electro-hydraulic control modules in a stacked configuration.

FIG. 3 depicts a plurality of electro-hydraulic control modules in a stacked configuration. Two control modules are shown: control module 311 and control module 313. Each of the control modules 311-313 is similar to the control module 211 of FIG. 2. The control modules 311-313 are hydraulically connected to ICVs 312A, 312B, respectively. The control module 311 is connected to the ICV 312A by hydraulic lines 398A, 399A. The control module 313 is connected to the ICV 312B by hydraulic lines 398B, 399B. The control modules 311-313 are said to be "stacked" because shared hydraulic lines are used to activate more than one control module. As depicted in FIG. 3, either hydraulic line 316 or hydraulic line 317 can function as the supply line and the other as the return line. In an instance of damage to one of the hydraulic lines, the damaged line will be used as the return line and the undamaged hydraulic line used as the supply line. Either of hydraulic line 316 or hydraulic line 317 can be used to open or close the ICVs 312A, 312B depending on which NC SOVs are energized or deenergized. The hydraulic line 316 and hydraulic line 317 can use a tee to branch to the control modules 311, 313. A dynamic flow regulator can be placed on hydraulic line 316 and/or hydraulic line 317 above and/or between control modules to provide flow control to facilitate conformance with an operating pressure range of the control modules. The placement of the dynamic flow regulator above and/or between control modules on hydraulic line 316 and/or hydraulic line 317 may depend on a variety of factors including the distance between control modules, the depth of a control module, and the pressure exerted on a control module by a hydraulic power system.

With an applied pressure on a hydraulic supply line, the NC SOVs in each of the control modules 311-313 can be controlled to open or close their corresponding ICV. For example, hydraulic line 316 as the supply line and hydraulic line 317 as the return line, a first NC SOV (e.g., NC SOV 220) in the control module 311 can be energized to open the ICV 312A, a first NC SOV in control module 313 can be energized to open the ICV 312B, or both can occur simultaneously. In another example, with the hydraulic line 317 as the supply line and hydraulic line 216 as the return line, a second NC SOV in the control module 311 can be energized to close the ICV 312A, a second NC SOV in the control module 313 can be energized to close the ICV 212B, or both can occur simultaneously. Thus, stacking the control modules allows the system to use shared hydraulic lines for control of a plurality of ICVs. Stacking also allows the use of only one electric line to the surface, e.g., via TEC. In a single control module configuration, the hydraulic lines terminate within or proximate to the "last" or "stack termination" control module (i.e., the last control module in the series).

Variations

While the aspects of the disclosure are described with reference to various implementations and exploitations, it will be understood that these aspects are illustrative. In general, techniques for opening and closing ICVs as described herein may be implemented with facilities consistent with any hardware system or hardware systems. Many variations, modifications, additions, and improvements are possible. For instance, some embodiments may split the components of the disclosed electro-hydraulic controller into different housings. This may be done to satisfy space constraints. When components of the electro-hydraulic controller are disposed within different housings, a tee block or a flow divider is used for branching of hydraulic lines into the different housings. In addition, embodiments are not limited to placement of the dynamic flow regulator as disclosed herein. While the disclosed illustrations are based on a preference to place the dynamic flow regulator proximate to the ICV actuated by the electro-hydraulic controller, embodiments can place the dynamic flow regulator anywhere on a hydraulic line among the components that form an electro-hydraulic controller. In embodiments with components disposed within different housings, a dynamic flow regulator may be disposed within each housing or fewer than all of the housings.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Embodiment #1: A system comprising: tubing; an interval control valve (ICV) coupled to the tubing, the ICV having an open side and a close side; a first hydraulic line and a second hydraulic line that are coupled with a hydraulic power system; a first electrical power line and a second electrical power line coupled with an electrical power source; and a set of one or more housings that enclose, a shuttle valve coupled with the first and the second hydraulic lines and hydraulically coupled with a first normally closed (NC) solenoid valve (SOV) and a second NC SOV; the first NC SOV and the second NC SOV respectively coupled with the first and second electrical power lines; a first check valve hydraulically coupled with the first hydraulic line, a second check valve, and both the first and second NC SOVs; the second check valve hydraulically coupled with the first and second NC SOVs, the first check valve, and the second hydraulic line; a flow regulator hydraulically coupled between the first NC SOV and the second NC SOV; a first inverse shuttle valve hydraulically coupled with the first hydraulic line, a dynamic flow regulator, a second inverse shuttle valve, and the open side of the ICV; the dynamic flow regulator having a first port that is hydraulically coupled to an NC hydraulic activated pilot cartridge and a second port that is hydraulically coupled with the first and second inverse shuttle valves; the second inverse shuttle valve hydraulically coupled with the second hydraulic line, the second port of the dynamic flow regulator, the first inverse shuttle valve, and a close side of the ICV; and the NC hydraulic activated pilot cartridge hydraulically coupled with the first and second NC SOVs, the shuttle valve, and the first port of the dynamic flow regulator.

Embodiment #2: The system of Embodiment 1, wherein the first hydraulic line is hydraulically coupled with an A-port of the first inverse shuttle valve, and the second hydraulic line is hydraulically coupled with an A-port of the second inverse shuttle valve.

Embodiment #3: The system of any one of Embodiments 1-2, wherein the shuttle valve is a 4-way shuttle valve.

Embodiment #4: The system of Embodiment 3, wherein the shuttle valve comprises a B-port hydraulically coupled to the first hydraulic line, an A-port of the shuttle valve hydraulically coupled with the second hydraulic line, a C-port of the shuttle valve hydraulically coupled with the first NC SOV, and a D-port of the shuttle valve hydraulically coupled with the second NC SOV and hydraulically coupled with the NC hydraulic activated pilot cartridge.

Embodiment #5: The system of any one of Embodiments 1-4, wherein the shuttle valve is a 3-way shuttle valve.

Embodiment #6: The system of Embodiment 5, wherein an A-port of the shuttle valve is hydraulically coupled with the second hydraulic line, a B-port of the shuttle valve is hydraulically coupled with the first hydraulic line, and a C-port of the shuttle valve is hydraulically coupled with a P-port of the first NC SOV, with a P-port of the second NC SOV, and with a Y-port of the NC hydraulic activated pilot cartridge.

Embodiment #7: The system of any one of Embodiments 1-6, wherein the first check valve and the second check valve being hydraulically coupled with both the first and second NC SOVs comprises the first check valve and the second check valve being coupled to a third hydraulic line that is coupled with an R-port of the first NC SOV and an R-port of the second NC SOV.

Embodiment #8: The system of Embodiment 7, wherein the flow regulator is disposed on the third hydraulic line.

Embodiment #9: The system of any one of Embodiments 1-8, wherein the NC hydraulic activated pilot cartridge being hydraulically coupled with the first and second NC SOVs, the shuttle valve, and the first port of the dynamic flow regulator comprises a Z-port of the NC hydraulic activated pilot cartridge being coupled with first port of the dynamic flow regulator, a W-port of the NC hydraulic activated pilot cartridge being coupled with an X-port of the second NC SOV, a V-port of the NC hydraulic activated pilot cartridge being coupled with X-port of the first NC SOV, and a Y-port of the NC hydraulic activated pilot cartridge being coupled with a P-port of the second NC SOV and with a D-port of the shuttle valve.

Embodiment #10: The system of any one of Embodiments 1-9, wherein the dynamic flow regulator is configured to maintain a constant differential pressure across the dynamic flow regulator.

Embodiment #11: The system of any one of Embodiments 9-10, wherein the dynamic flow regulator comprises an automatically adjustable variable-metering orifice.

Embodiment #12: The system of any one of Embodiments 1-11, wherein the dynamic flow regulator having a first port that is hydraulically coupled to an NC hydraulic activated pilot cartridge and a second port that is hydraulically coupled with the first and second inverse shuttle valves comprises the first port of the dynamic flow regulator being coupled with a Z-port of the NC hydraulic activated pilot cartridge and the second port of the dynamic flow regulator being hydraulically coupled with B-ports of the first and second shuttle valves.

Embodiment #13: The system of any one of Embodiments 1-12, wherein the NC hydraulic activated pilot cartridge is a two-position, four-port valve having a closed position and an open position, wherein the NC hydraulic activated pilot cartridge is biased toward the closed position by a biasing member, wherein, in the closed position, the NC hydraulic activated pilot cartridge allows flow in a first direction from a Z-port to a Y-port and blocks flow in a second direction from the Y-port to the Z-port, wherein, in the open position, the NC hydraulic activated pilot cartridge allows bidirectional hydraulic communication between the Z-port and the Y-port, and wherein the NC hydraulic activated pilot cartridge is actuated to the closed position and the open position by two pilot ports.

Embodiment #14: An apparatus comprising: first and the second hydraulic lines; a first normally closed (NC) solenoid valve (SOV) and a second NC SOV; a shuttle valve coupled with the first and the second hydraulic lines and hydraulically coupled with the first and the second NC SOVs; a first check valve hydraulically coupled with the first hydraulic line, a second check valve, and both the first and second NC SOVs; the second check valve hydraulically coupled with the first and second NC SOVs, the first check valve, and the second hydraulic line; a flow regulator hydraulically coupled between the first NC SOV and the second NC SOV; a first inverse shuttle valve hydraulically coupled with the first hydraulic line, a dynamic flow regulator, a second inverse shuttle valve, and adapted to be coupled with an open side of an interval control valve (ICV); the dynamic flow regulator having a first port that is hydraulically coupled to an NC hydraulic activated pilot cartridge and a second port that is hydraulically coupled with the first and second inverse shuttle valves; the second inverse shuttle valve hydraulically coupled with the second hydraulic line, the second port of the dynamic flow regulator, the first inverse shuttle valve, and a close side of the ICV; and the NC hydraulic activated pilot cartridge hydraulically coupled with the first and second NC SOVs, the shuttle valve, and the first port of the dynamic flow regulator.

Embodiment #15: The apparatus of Embodiment 14, wherein the first hydraulic line is hydraulically coupled with an A-port of the first inverse shuttle valve, and the second hydraulic line is hydraulically coupled with an A-port of the second inverse shuttle valve.

Embodiment #16: The apparatus of any one of Embodiments 14-15, wherein the shuttle valve is a 4-way shuttle valve having an A-port, B-port, C-port, and D-port, wherein the B-port is hydraulically coupled to the first hydraulic line, the A-port is hydraulically coupled with the second hydraulic line, the C-port is hydraulically coupled with a P-port of the first NC SOV, and a D-port is hydraulically coupled with a P-port of the second NC SOV and with a Y-port of the NC hydraulic activated pilot cartridge.

Embodiment #17: The apparatus of any one of Embodiments 14-16, wherein the shuttle valve is a 3-way shuttle valve having an A-port, B-port, and C-port, wherein the A-port of the shuttle valve is hydraulically coupled with the second hydraulic line, the B-port of the shuttle valve is hydraulically coupled with the first hydraulic line, and the C-port of the shuttle valve is hydraulically coupled with a P-port of the first NC SOV, with a P-port of the second NC SOV, and with a Y-port of the NC hydraulic activated pilot cartridge.

Embodiment #18: The apparatus of any one of Embodiments 14-17, wherein the first check valve and the second check valve being hydraulically coupled with both the first and second NC SOVs comprises the first check valve and the second check valve being coupled to a third hydraulic line that is coupled with an R-port of the first NC SOV and an R-port of the second NC SOV.

Embodiment #19: The apparatus of Embodiment 18, wherein the flow regulator is disposed on the third hydraulic line.

Embodiment #20: The apparatus of any one of Embodiments 14-19, wherein the NC hydraulic activated pilot cartridge being hydraulically coupled with the first and second NC SOVs, the shuttle valve, and the first port of the dynamic flow regulator comprises a Z-port of the NC hydraulic activated pilot cartridge being coupled with first port of the dynamic flow regulator, a W-port of the NC hydraulic activated pilot cartridge being coupled with an X-port of the second NC SOV, a V-port of the NC hydraulic activated pilot cartridge being coupled with X-port of the first NC SOV, and a Y-port of the NC hydraulic activated pilot cartridge being coupled with a P-port of the second NC SOV and with a D-port of the shuttle valve.

The invention claimed is:
1. A system comprising:
   tubing;
   an interval control valve (ICV) coupled to the tubing, the ICV having an open side and a close side;
   a first hydraulic line and a second hydraulic line that are coupled with a hydraulic power system;
   a first electrical power line and a second electrical power line coupled with an electrical power source; and
   a set of one or more housings that enclose,
      a shuttle valve coupled with the first and the second hydraulic lines and hydraulically coupled with a first normally closed (NC) solenoid valve (SOV) and a second NC SOV;
      the first NC SOV and the second NC SOV respectively coupled with the first and second electrical power lines;
      a first check valve hydraulically coupled with the first hydraulic line, a second check valve, and both the first and second NC SOVs;
      the second check valve hydraulically coupled with the first and second NC SOVs, the first check valve, and the second hydraulic line;
      a flow regulator hydraulically coupled between the first NC SOV and the second NC SOV;
      a first inverse shuttle valve hydraulically coupled with the first hydraulic line, a dynamic flow regulator, a second inverse shuttle valve, and the open side of the ICV;
      the dynamic flow regulator having a first port that is hydraulically coupled to an NC hydraulic activated pilot cartridge and a second port that is hydraulically coupled with the first and second inverse shuttle valves;
      the second inverse shuttle valve hydraulically coupled with the second hydraulic line, the second port of the dynamic flow regulator, the first inverse shuttle valve, and the close side of the ICV; and
      the NC hydraulic activated pilot cartridge hydraulically coupled with the first and second NC SOVs, the shuttle valve, and the first port of the dynamic flow regulator.
2. The system of claim 1, wherein the first hydraulic line is hydraulically coupled with an A-port of the first inverse shuttle valve, and the second hydraulic line is hydraulically coupled with an A-port of the second inverse shuttle valve.

3. The system of claim 1, wherein the shuttle valve is a 4-way shuttle valve.

4. The system of claim 3, wherein the shuttle valve comprises a B-port hydraulically coupled to the first hydraulic line, an A-port of the shuttle valve hydraulically coupled with the second hydraulic line, a C-port of the shuttle valve hydraulically coupled with the first NC SOV, and a D-port of the shuttle valve hydraulically coupled with the second NC SOV and hydraulically coupled with the NC hydraulic activated pilot cartridge.

5. The system of claim 1, wherein the shuttle valve is a 3-way shuttle valve.

6. The system of claim 5, wherein an A-port of the shuttle valve is hydraulically coupled with the second hydraulic line, a B-port of the shuttle valve is hydraulically coupled with the first hydraulic line, and a C-port of the shuttle valve is hydraulically coupled with a P-port of the first NC SOV, with a P-port of the second NC SOV, and with a Y-port of the NC hydraulic activated pilot cartridge.

7. The system of claim 1, wherein the first check valve and the second check valve being hydraulically coupled with both the first and second NC SOVs comprises the first check valve and the second check valve being coupled to a third hydraulic line that is coupled with an R-port of the first NC SOV and an R-port of the second NC SOV.

8. The system of claim 7, wherein the flow regulator is disposed on the third hydraulic line.

9. The system of claim 1, wherein the NC hydraulic activated pilot cartridge being hydraulically coupled with the first and second NC SOVs, the shuttle valve, and the first port of the dynamic flow regulator comprises a Z-port of the NC hydraulic activated pilot cartridge being coupled with first port of the dynamic flow regulator, a W-port of the NC hydraulic activated pilot cartridge being coupled with an X-port of the second NC SOV, a V-port of the NC hydraulic activated pilot cartridge being coupled with X-port of the first NC SOV, and a Y-port of the NC hydraulic activated pilot cartridge being coupled with a P-port of the second NC SOV and with a D-port of the shuttle valve.

10. The system of claim 1, wherein the dynamic flow regulator is configured to maintain a constant differential pressure across the dynamic flow regulator.

11. The system of claim 1, wherein the dynamic flow regulator having the first port that is hydraulically coupled to the NC hydraulic activated pilot cartridge and the second port that is hydraulically coupled with the first and second inverse shuttle valves comprises the first port of the dynamic flow regulator being coupled with a Z-port of the NC hydraulic activated pilot cartridge and the second port of the dynamic flow regulator being hydraulically coupled with B-ports of the first and second inverse shuttle valves.

12. The system of claim 1, wherein the NC hydraulic activated pilot cartridge is a two-position, four-port valve having a closed position and an open position,
wherein the NC hydraulic activated pilot cartridge is biased toward the closed position by a biasing member,
wherein, in the closed position, the NC hydraulic activated pilot cartridge allows flow in a first direction from a Z-port to a Y-port and blocks flow in a second direction from the Y-port to the Z-port,
wherein, in the open position, the NC hydraulic activated pilot cartridge allows bidirectional hydraulic communication between the Z-port and the Y-port, and
wherein the NC hydraulic activated pilot cartridge is actuated to the closed position and the open position by two pilot ports.

13. An apparatus comprising:
a first hydraulic line and a second hydraulic line;
a first normally closed (NC) solenoid valve (SOV) and a second NC SOV;
a shuttle valve coupled with the first and the second hydraulic lines and hydraulically coupled with the first and the second NC SOVs;
a first check valve hydraulically coupled with the first hydraulic line, a second check valve, and both the first and second NC SOVs;
the second check valve hydraulically coupled with the first and second NC SOVs, the first check valve, and the second hydraulic line;
a flow regulator hydraulically coupled between the first NC SOV and the second NC SOV;
a first inverse shuttle valve hydraulically coupled with the first hydraulic line, a dynamic flow regulator, a second inverse shuttle valve, and adapted to be coupled with an open side of an interval control valve (ICV);
the dynamic flow regulator having a first port that is hydraulically coupled to an NC hydraulic activated pilot cartridge and a second port that is hydraulically coupled with the first and second inverse shuttle valves;
the second inverse shuttle valve hydraulically coupled with the second hydraulic line, the second port of the dynamic flow regulator, the first inverse shuttle valve, and a close side of the ICV; and
the NC hydraulic activated pilot cartridge hydraulically coupled with the first and second NC SOVs, the shuttle valve, and the first port of the dynamic flow regulator.

14. The apparatus of claim 13, wherein the first hydraulic line is hydraulically coupled with an A-port of the first inverse shuttle valve, and the second hydraulic line is hydraulically coupled with an A-port of the second inverse shuttle valve.

15. The apparatus of claim 13, wherein the shuttle valve is a 4-way shuttle valve having an A-port, B-port, C-port, and D-port, wherein the B-port is hydraulically coupled to the first hydraulic line, the A-port is hydraulically coupled with the second hydraulic line, the C-port is hydraulically coupled with a P-port of the first NC SOV, and a D-port is hydraulically coupled with a P-port of the second NC SOV and with a Y-port of the NC hydraulic activated pilot cartridge.

16. The apparatus of claim 13, wherein the shuttle valve is a 3-way shuttle valve having an A-port, B-port, and C-port, wherein the A-port of the shuttle valve is hydraulically coupled with the second hydraulic line, the B-port of the shuttle valve is hydraulically coupled with the first hydraulic line, and the C-port of the shuttle valve is hydraulically coupled with a P-port of the first NC SOV, with a P-port of the second NC SOV, and with a Y-port of the NC hydraulic activated pilot cartridge.

17. The apparatus of claim 13, wherein the first check valve and the second check valve being hydraulically coupled with both the first and second NC SOVs comprises the first check valve and the second check valve being coupled to a third hydraulic line that is coupled with an R-port of the first NC SOV and an R-port of the second NC SOV.

18. The apparatus of claim 17, wherein the flow regulator is disposed on the third hydraulic line.

19. The apparatus of claim 13, wherein the NC hydraulic activated pilot cartridge being hydraulically coupled with the first and second NC SOVs, the shuttle valve, and the first port of the dynamic flow regulator comprises a Z-port of the NC hydraulic activated pilot cartridge being coupled with first port of the dynamic flow regulator, a W-port of the NC hydraulic activated pilot cartridge being coupled with an X-port of the second NC SOV, a V-port of the NC hydraulic activated pilot cartridge being coupled with X-port of the first NC SOV, and a Y-port of the NC hydraulic activated pilot cartridge being coupled with a P-port of the second NC SOV and with a D-port of the shuttle valve.

* * * * *